United States Patent [19]

Andersson

[11] Patent Number: 4,789,186
[45] Date of Patent: Dec. 6, 1988

[54] BELT GUIDE FITTING

[75] Inventor: Bert R. Andersson, Göteborg, Sweden

[73] Assignee: AB Volvo, Goteborg, Sweden

[21] Appl. No.: 907,488

[22] Filed: Sep. 15, 1986

[30] Foreign Application Priority Data

Sep. 23, 1985 [SE] Sweden ................ 8504395

[51] Int. Cl.⁴ .............................. B60R 21/10
[52] U.S. Cl. ..................... 280/808; 297/483
[58] Field of Search ............ 280/801, 802, 808; 297/483

[56] References Cited

U.S. PATENT DOCUMENTS

| | | | |
|---|---|---|---|
| 4,402,528 | 9/1983 | Fohl | 280/808 |
| 4,473,243 | 9/1984 | Ogawa | 280/808 |
| 4,536,010 | 8/1985 | Matsunami et al. | 280/802 |

FOREIGN PATENT DOCUMENTS

| | | | |
|---|---|---|---|
| 1157498 | 11/1963 | Fed. Rep. of Germany | 280/801 |
| 2428814 | 1/1976 | Fed. Rep. of Germany . | |
| 2726683 | 1/1979 | Fed. Rep. of Germany . | |
| 3023093 | 2/1982 | Fed. Rep. of Germany . | |
| 3103114 | 8/1982 | Fed. Rep. of Germany . | |
| 3200118 | 7/1983 | Fed. Rep. of Germany . | |
| 1556738 | 12/1968 | France | 280/801 |
| 102748 | 8/1980 | Japan | 280/808 |
| 389451 | 11/1976 | Sweden . | |
| 1531415 | 11/1978 | United Kingdom | 280/808 |

Primary Examiner—John J. Love
Assistant Examiner—Ross Weaver
Attorney, Agent, or Firm—Young & Thompson

[57] ABSTRACT

The present invention relates to a belt guide fitting for guiding a safety belt of three-point type at its upper anchor point. The guide fitting comprises a plate with a through slot for the belt. The plate is pivotally mounted on a pin which lies forward, relative to the vehicle, of the mid-point of the slot when the fitting is mounted in a vehicle body. In order to prevent the belt in a collision from sliding laterally in the through slot and bunching at the end of the slot, the plate in accordance with the invention cooperates with structure limiting the pivotal movement of the plate, this structure being designed, when the belt is subjected to a collision load, to fix the plate in a predetermined angular position for collision.

2 Claims, 1 Drawing Sheet

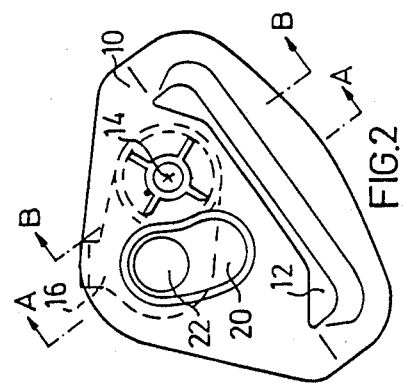
FIG.2
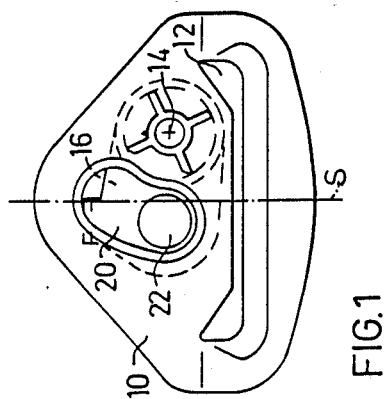
FIG.1
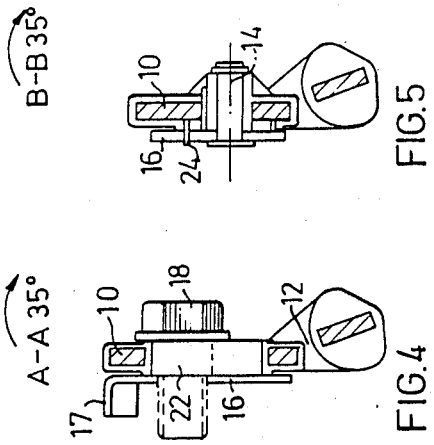
FIG.5
FIG.4
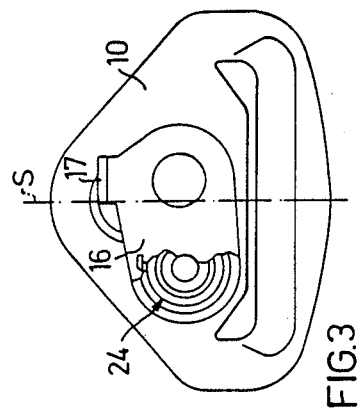
FIG.3

BELT GUIDE FITTING

The present invention relates to a belt guide fitting, especially for guiding a belt at its upper anchor point in a vehicle safety belt of three-point type, said belt guide fitting comprising a plate with a through-slot for the belt, said plate being pivotally mounted on a pin which lies forward, relative to the vehicle, of the midpoint of the slot when said fitting is mounted in a vehicle body.

A belt guide fitting of this type is disclosed in U.S. Pat. No. 4,402,528 (FIG. 3). A disadvantage of this fitting is that when the belt is subjected to a collision load it has a tendency to pivot the fitting in an uncontrolled manner so that the belt is forced laterally in the slot and bunches at one end of the slot. This reduces the strength of the belt to such a degree that there is risk of belt rupture with devastating results to the person fastened in his seat by the safety belt.

A previously known solution for preventing such bunching at one end of the belt slot in the fitting has been to permanently fix the position of the fitting in an angular position which is suitable in a collision. One disadvantage of this is, however, that comfort is sacrificed and wear on the belt is increased.

The main object of the present invention is to remove the disadvantages of the previously known guide fittings and achieve a fitting, the design of which combines the advantages of the movable fitting, i.e. comfort and low wear on the belt, with the advantages of the fixed fitting, i.e. prevention of belt bunching at either end of the belt slot in a collision, thus elminating the risk of belt rupture.

In the most general case this is achieved according to the invention by the plate being provided with means limiting the pivoting of the plate, said means being arranged, when the belt is subjected to a collision load, to fix the plate in a predetermined angular position for collision. This provides a belt guide fitting which is pivotable during normal use but which in a collision is made to assume a predetermined angular position.

According to a preferred embodiment of the invention, the means limiting the pivoting of the plate consist of a recess in the plate spaced from the pivot pin, into which recess a projection extends which limits the pivoting of the plate when the projection strikes the end of the recess. This provides a controlled and safe pivoting of the guide fitting plate to the predetermined angular position for collision thus eliminating the risk of the belt bunching at the end of the slot.

It is suitable that the pivot pin be journalled in a plate supporting carrier element which is arranged to be non-rotatably fixed in the mounting.

According to a preferred embodiment of the guide fitting according to the invention, the projection consists of a fastening screw which securely fixes the carrier element in the mounting.

According to a preferred embodiment of the belt guide fitting according to the invention, the projection, when in its recess-end position determining the collision position of the plate, lies on the line of symmetry of the belt slot, thus minimizing the load on the carrier.

The invention will be described in more detail below with reference to the accompanying drawing, wherein FIG. 1 is a side view of a first embodiment of the belt guide fitting according to the invention in its first end position;

FIG. 2 shows the guide fitting of FIG. 1 in a predetermined pivot position in a collision;

FIG. 3 is a rear view of the guide fitting shown in FIGS. 1 and 2;

FIG. 4 is a cross-sectional view along the line A—A in FIG. 2; and

FIG. 5 is a cross-sectional view along the line B—B in FIG. 2.

The embodiment shown in FIGS. 1–5 of the guide fitting according to the invention comprises a plate 10 with a through slot 12 for a belt (not shown). The plate 10 is arranged to pivot about the pin 14 which rotatably connects the plate 10 to the carrier 16, which is designed to be securely mounted in a mounting (not shown), for example a door post in a car body. For this purpose, the carrier 16 has a flange 17, which enables the carrier 16 to be non-rotatably mounted in a corresponding cavity in the body mounting. The carrier 16 is locked in its position in the mounting by means of a fixing screw 18, as is best shown in FIG. 4.

As can be seen in FIGS. 1 and 2, the pivot 14 is placed asymmetrically relative to the line of symmetry S of the slot 12, specifically to the right of this line when the fitting is to be mounted to the lap of the person to be fastened in the seat. When mounted to the right, the pivot pin is mounted to the left of this line of symmetry S.

A fixed projection 22 extends into a recess in the form of a further slot 20 or groove in the plate 10. This projection 22 is arranged upon striking the ends of the recess to limit the pivot movement of the plate 10 between a rest position shown in FIG. 1 and a predetermined angular position, suitable for a collision situation according to FIG. 2, of about 43° to the vertical. The projection 22 is preferably a portion of the fixing screw 18, which thus constitutes at the same time the fastening for the guide plate 10 on the carrier 16 and the stop means for determining a maximum pivot position corresponding to the suitable collision position for the guide fitting to minimize the risk of the belt sliding laterally during the collision in one direction or the other in the slot 12 and being bunched at the slot end increasing the risk of belt rupture. The slot 20 is preferably oriented in the plate 10 so that the projection 22 lies on the line of symmetry S of the belt slot 12 when the guide fitting plate 10 assumes its maximum pivot position for absorbing the collision force as shown in FIG. 2, thus minimizing the load on the carrier 16. As can be seen in FIGS. 3 and 5 a torsion spring 24 in the form of a flat spiral is arranged around the pivot pin 14 between the carrier 16 and the plate 10 so as to bias the plate toward the position shown in FIG. 1. This enables the plate to adapt to the initial and final angles of the belt.

I claim:

1. A belt guide fitting, especially for guiding a belt at its upper anchor point in a vehicle safety belt of three-point type, comprising a plate with a through slot for the belt, said plate being pivotally mounted on a pin, which lies forward, relative to the vehicle, of the midpoint of the slot, when said fitting is mounted in a vehicle body, characterized in that the plate is provided with means limiting the pivoting of the plate, said means being arranged, when the belt is subjected to a collision load, to fix the plate in a predetermined angular position for collision, the means limiting the pivoting of the plate consisting of a recess in the plate spaced from the pivot pin into which recess a projection extends which limits the pivoting of the plate when the projection strikes an end of the recess, the pivot pin being journalled in a plate supporting carrier element arranged to be non-rotatably fixed in a mounting, the projection consisting of a fastening screw which securely fixes the carrier element in the mounting.

2. A belt guide fitting, especially for guiding a belt at its upper anchor point in a vehicle safety belt of three-point type, comprising a plate with a through slot for the belt, said plate being pivotally mounted on a pin, which lies forward, relative to the vehicle, of the midpoint of the slot, when said fitting is mounted in a vehicle body, characterized in that the plate is provided with means limiting the pivoting of the plate, said means being arranged, when the belt is subjected to a collision load, to fix the plate in a predetermined angular position for collision, the means limiting the pivoting of the plate consisting of a recess in the plate spaced from the pivot pin into which recess a projection extends which limits the pivoting of the plate when the projection strikes an end of the recess, the projection, when in its recess-end position determining the collision position of the plate, lying on the line of symmetry of the belt slot.

* * * * *